United States Patent Office 3,654,143
Patented Apr. 4, 1972

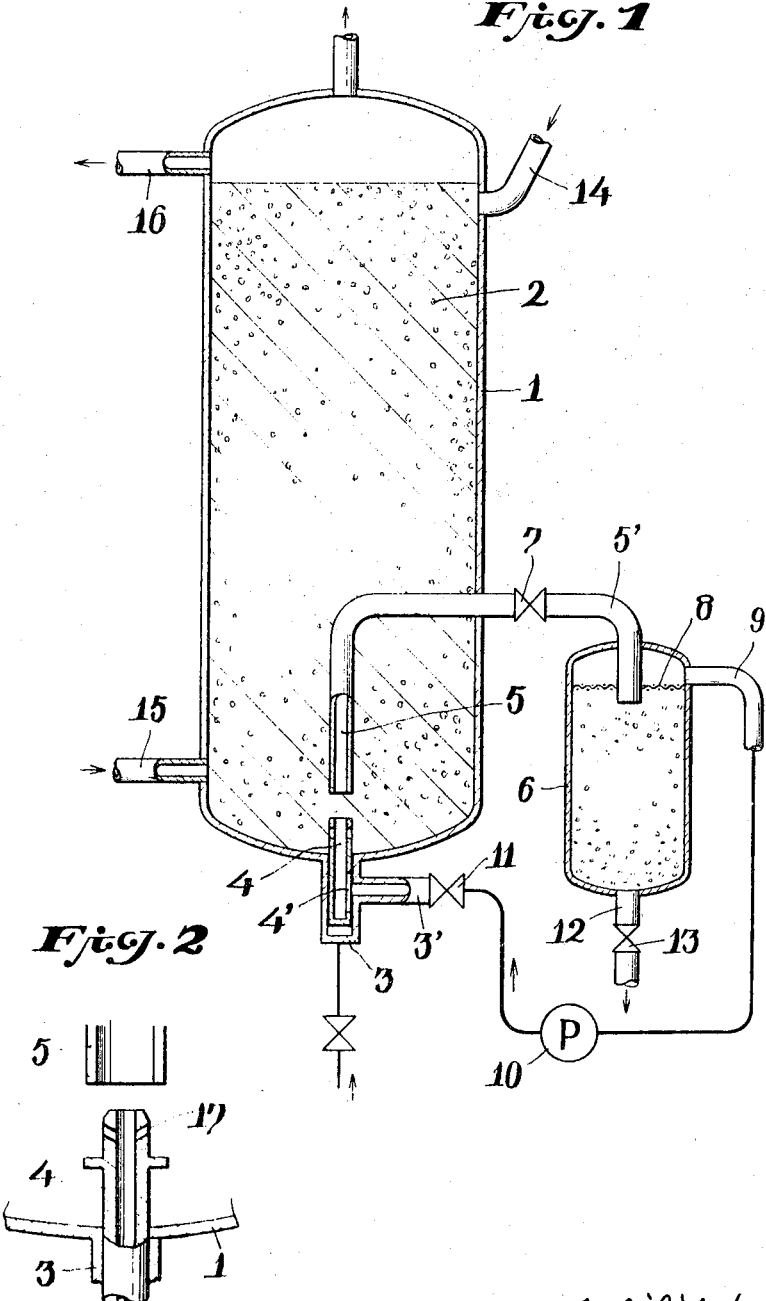

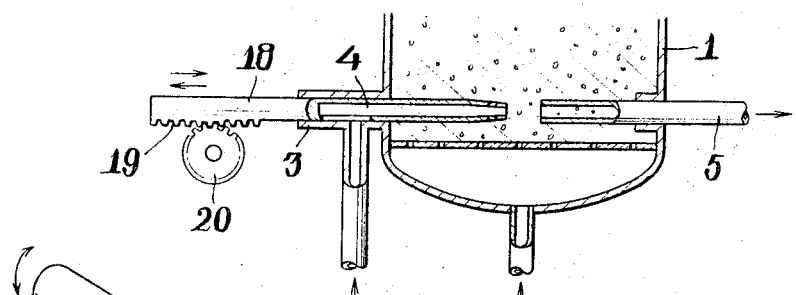
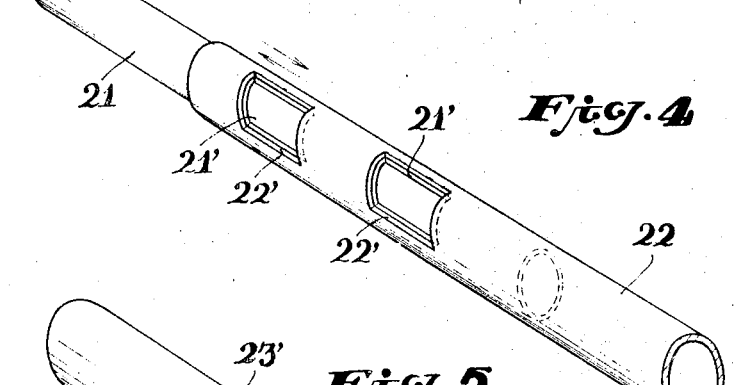
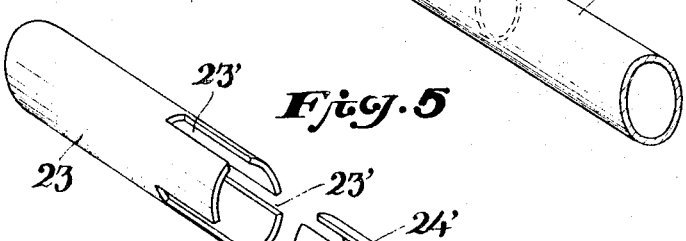
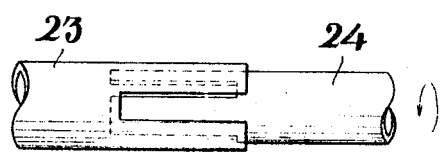

3,654,143
METHOD AND APPARATUS FOR WITHDRAWING SOLID CATALYST PARTICLES
Yoshihide Kodera, Kawasaki-shi, Jun Kato and Kazuo Shimada, Tokyo, Morio Suzuki, Fujisawa-shi, Hidetaka Ohse, Soka-shi, and Satoshi Ohshima and Yasunori Kuriki, Tokyo, Japan, assignors to Agency of Industrial Science and Technology, Tokyo, Japan
Filed Dec. 29, 1969, Ser. No. 888,470
Claims priority, application Japan, Dec. 28, 1968, 44/95,945
Int. Cl. C10g 23/06
U.S. Cl. 208—146
4 Claims

ABSTRACT OF THE DISCLOSURE

In catalyst in a reaction tank having a material feed pipe at the lower portion thereof and a product-taking-out-pipe at the upper portion thereof, a discharge nozzle and a suction nozzle are provided, the discharge nozzle being connected to the discharge side of a pump provided outside the reaction tank and the suction nozzle being connected to the suction side of the pump, respectively. When the pump operates, a reaction liquid is discharged from the discharge nozzle and then sucked into the suction nozzle along with catalyst. Thus, catalyst is recovered in a catalyst recovery tank provided between the suction nozzle and the pump, and the reaction liquid is circulated from the pump to the suction nozzle through the discharge nozzle. Either the discharge nozzle or the suction nozzle is, as occasion demands, slid so as to make contact with the other. Thus, the inner surface of the suction nozzle is rinsed by circulating a reaction liquid, and thereby catalyst adhering to the inner surface of the said suction nozzle is removed.

---

The present invention relates to a method and apparatus for withdrawing catalyst particles from a reaction tank containing solid catalyst particles.

Hitherto, catalyst to be regenerated or disposed or have been taken out of a reaction tank by means of natural dropping due to gravity, suction by an overflow pump etc. In these methods, however, great care has to be taken to prevent the destruction or contamination of catalyst particles due to their contact with part members of an apparatus when they are taken out. Especially, catalyst particles to be used under a high temperature and high pressure are subjected to severe conditions, and therefore particles adhere to each other to form a lump or adhere to the inner wall of a reaction tank or pipes, thus making it extremely difficult to take them out of a reaction tank smoothly.

According to the method of U.S. Pat. No. 3,336,217, a catalyst flows in a high pressure reaction tank and is withdrawn from a U-type pipe provided at the bottom of said reaction tank. The interior of the U-type pipe is rinsed by surging a reaction liquid back by hydrogen gas.

An object of the present invention is to provide a method and apparatus for easily withdrawing catalyst particles from a reaction tank continuously or intermittently during operation.

Another object of the present invention is to provide a method and apparatus for smoothly withdrawing catalyst particles from a reaction tank having a fixed or stationary bed during operation.

Still another object of the present invention is to provide a method and apparatus for withdrawing deactivated catalyst particles which accumulate on the bottom of a reaction tank successively and continuously or intermittently.

Other objects and features of the present invention will become apparent by reference to the following detailed description and in conjunction with the accompanying drawings in which;

FIG. 1 is a sectional side view of an apparatus to be used for performing a method according to the present invention;

FIG. 2 is an enlarged sectional view of a discharge nozzle according to the present invention;

FIG. 3 is a sectional view of another embodiment of the present invention;

FIG. 4 is a slant view of another emodiment of a discharge nozzle and a suction nozzle according to the present invention;

FIG. 5 is a slant view of still another embodiment of a discharge nozzle and a suction nozzle according to the present invention, which are not fitted yet; and FIG. 6 is a side view illustrating a fitted condition of the discharge nozzle and suction nozzle depicted in FIG. 5.

New referring to FIG. 1, supporting pipe 3 is provided at the bottom of reaction tank 1 charged with solid catalyst 2 so that one end of said supporting pipe is opened within said tank 1. Discharge nozzle 4 is fitted into said supporting pipe 3. Said discharge nozzle 4 is adapted to slide within said supporting pipe 3 by a pressure from an air pressure pump or an oil hydraulic pump (not shown in the drawing) so that the length of its portion to project into said reaction tank 1 can be adjusted. Suction nozzle 5 is provided at a specified distance from said discharge nozzle 4 so that their opening ends face each other. The other end 5' of said suction nozzle is directed by way of valve 7 to catalyst recovery tank 6 which is provided outside the reaction tank. Catalyst-taking-out-pipe 12 is connected to the bottom of said catalyst recovery tank 6 by way of valve 13. The top of tank 6 is covered with filter 8 such as, wire netting or perforated plate made of a material which is not corroded by a reaction liquid. This filter serves to prevent catalyst 2 discharged from suction nozzle 5' from flowing to reaction liquid circulation pipe 9. Pump 10 is provided in said reaction liquid circulation pipe 9. The reaction liquid sucked from catalyst recovery tank 6 by means of said pump is discharged through branch pipe 3' of supporting pipe 3 connected to another end of pipe 9 by way of valve 11 and through slit 4' provided on discharge nozzle 4 at its portion to be slid within said supporting pipe in a position corresponding to said branch pipe 3'. This reaction liquid is then injected into reaction tank 1 from discharge nozzle 4. The reaction liquid thus injected is sucked into the suction pipe together with the catalyst present between discharge nozzle 4 and suction nozzle 5 and is set to catalyst recovery tank 6. In a case where the discharge nozzle and the suction nozzle are, as shown in FIG. 1, provided vertically in the reaction tank, it is preferable to have a distance between the discharge nozzle and the suction nozzle equal to less than three times the inner diameter of the suction nozzle, if the distance is greater than the latter-mentioned figure, withdrawal of catalyst is not carried out smoothly.

In the reaction tank of the above-described construction, a material is fed through material feed pipe 15 under a specified temperature and pressure and the product is withdrawn from product-taking-out-pipe 16. On the other hand, the reaction liquid is sucked from the suction nozzle by means of the pump provided at the circulation pipe and is injected from the discharge nozzle. Thus, the circulating flow of reaction liquid passes through the catalyst in the reaction tank. In this way the catalyst is easily recovered during reaction process by recovering deactivated catalyst successively and feeding a catalyst from catalyst feed pipe 14 as occasion demands.

The amount of catalyst to be withdrawn can be freely adjusted in accordance with the distance between the discharge nozzle and the suction nozzle, their diameters, the capacity of the pump etc. Although a case where one pair consisting of a discharge nozzle and a suction nozzle are provided is shown in the drawing, two or more pairs of them can be provided depending on the dimensions of the reaction tank used.

In the case of hydrogenation reaction, for example, carbon sludges or the like adhere to the surface of the catalyst sucked by suction nozzle 5, and therefore they may adhere to the inner wall of said nozzle. In such a case, the catalyst adhering to the inner wall can be easily removed by contacting the end of discharge nozzle to the suction nozzle by sliding the former and circulating a reaction liquid vigorously.

The shape of the discharge nozzle should be of a projecting form as shown in FIG. 2. If a discharge hole is provided at the side of the nozzle, too, the suction of catalyst into the suction nozzle is enhanced because of the break-down of solidified catalyst by blowing. At the same time, the destruction of catalyst caught between both nozzles can be prevented, because the catalyst around the discharge nozzle is blown away when contacting said discharge nozzle to said suction nozzle. The catalyst which collects in catalyst recovery tank 6 is taken out by means of pipe 12, but if pressure is present in the reaction system, the catalyst is taken out by shutting valve 7 and opening valve 13.

FIG. 3 illustrates another embodiment of the invention wherein a discharge nozzle is horizontally slid by means of a rack and a pinion. In FIG. 3, rear portion 18 of discharge nozzle 4 is projected outside from supporting pipe 3. Rack 19 is provided in this projecting portion 18 of the discharge nozzle. Pinion 20 is provided so as to engage with said rack. Due to the rotation of said pinion, the discharge nozzle slidably moves within said supporting pipe 3, thus adjusting the distance between it and a suction nozzle. The rotation of said pinion 20 can be effected either by a mechanical means such as a motor or manually. In a case where the discharge nozzle and the suction nozzle are, as shown in FIG. 3, provided horizontally in the reaction tank, it is preferable to have a distance between the discharge nozzle and the suction nozzle equal to less than the inner diameter of the suction nozzle. If the distance is greater than the latter-mentioned figure, withdrawal of catalyst is not carried out smoothly.

Shown in FIG. 3 is a case where a discharge nozzle is slid. It is, however, possible to make the suction nozzle slide.

In the embodiments shown in FIGS. 1 and 3, a discharge nozzle and a suction nozzle are separately provided within a reaction tank. Below illustrated is another embodiment wherein a discharge nozzle is fitted to a suction nozzle.

Referring to FIG. 4, suction nozzle 22 is fitted to discharge nozzle 21 having one or a plurality of slits 21' so that said slit 21' overlaps. Slit 22' is provided in a position corresponding to said slit 21'. When slits 21' and 22' come to the same position by sliding or rotating either the discharge nozzle or the suction nozzle, the slit is opened and a catalyst flows into the suction nozzle through said slits 21' and 22'. When said slit is to be closed, either of said nozzles is rotated or slid, and at the same time valve 7 is closed to a certain degree. Thus, the amount of suction of reaction liquid being circulated by means of pump 10 decreases. Therefore, the slit is closed, discharging reaction fluid, and the catalyst will not be caught in the slit.

Shown in FIG. 5 is discharge pipe 23 having a plurality of recesses 23' at the end thereof and suction pipe 24 having a plurality of recesses 24'. The opening and closing of the slit can be easily accomplished in the same way as is done in the embodiment shown in FIG. 4 by fitting said two pipes so that their respective recesses overlap as shown in FIG. 6 and rotating either of them.

As described above, the present invention permits the withdrawal of catalyst particles during operation by applying it to a reaction tank charged with catalyst particles in the stationary condition and high density in a fixed or stationary bed. Therefore, since it is not necessary to positively flow a catalyst, the amount of catalyst to be charged is increased and reaction is effectively performed.

On the other hand, even in the case of fluidized bed, it is possible to withdraw during reaction process such catalyst only which is settled or deposited on the bottom of the tank due to pulverization or solidification.

Furthermore, the temperature change in a reaction tank to be caused at the start of withdrawal of catalyst can be avoided by always keeping a reaction liquid circulating even during the period of time when a catalyst is not withdrawn.

Thus, an apparatus incorporating the present invention can be widely used for catalytic hydrogenation reaction of hydrocarbon oil, Fisher-Tropsch synthesis of hydrocarbon or various kinds of industrial catalytic reaction.

Next, below is given a description of an example of application of the principles of the invention to catalytic hydrodesulfurization reaction of heavy oil. It should be understood, however, that the present invention is not limited to the embodiment described but may be embodied otherwise without departing from the principles of the present invention.

EXAMPLE 1

In the reaction apparatus as shown in FIG. 1, 13 l. of catalyst having a grain diameter of 1.2 mm. and consisting of cobalt-molybdenum supported by alumina were introduced into a reaction tank of 2000 mm. in overall length and 100 mm. in inner diameter. Residual oil (specific gravity 0.980, viscosity 402.6 cst. at 50° C., initial boiling point 300° C. and sulfur content 4.26%) obtained from atmospheric distillation of Khafji crude oil was fed into the reaction tank at the space velocity of liquid of 1 under the conditions of reaction temperature of 400° C. and reaction pressure of 200 kg./cm.$^2$.

The shape of the discharge nozzle provided at the lower portion of the reaction tank was as shown in FIG. 2. The diameter of discharge nozzle is 3 mm. and that of a hole provided at the side is 2 mm. Four such holes were provided. The inside diameter of the suction nozzle was 10 mm. When the distance between the discharge nozzle and the suction nozzle was about 5 mm., catalyst particles of about 0.22 l. could be withdrawn in one minute by setting the circulating linear velocity of reaction liquid in the suction nozzle at approximately 100 mm. per sec. Desulfurization rate of about 80% could be maintained by withdrawing about 0.26 l. of catalyst once a day during the reaction process and supplying new catalyst of the same amount from the upper portion of the reaction tank.

EXAMPLE 2

Spherical catalyst having a grain diameter of 1.2 mm.–1.8 mm. and consisting of cobalt-molybdenum supported by alumina was introduced into a reaction tank, as shown in FIG. 1, of 200 mm. inner diameter in which a discharge nozzle of 5 mm. inner diameter and a suction nozzle of 20 mm. inner diameter were provided at the lower portion thereof. In the discharge nozzle, four discharge holes of 3 mm. inner diameter were provided at the side thereof and 20 mm. below the upper edge thereof, and the distance between the discharge nozzle and the suction nozzle was 40 mm. The residual oil (specific gravity 0.975, viscosity 402.6 cst. at 50° C., initial boiling point about 300° C. and sulfur content 4.3%) obtained from atmospheric distillation of Khafji crude oil was fed into the reaction tank under a temperature of about 377° C. and a pressure of 200 kg./cm.$^2$ and was subject to hydrodesulfurization reaction.

When the circulating linear velocity of reaction liquid in the suction nozzle was set at approximately 500 mm. per sec. by operating a pump, about 4.7 l. of catalyst particles could be withdrawn in one minute. The product obtained has 0.916 in specific gravity, 93.6 in viscosity and 0.76 weight percent in sulfur content.

EXAMPLE 3

In the reaction apparatus, as shown in FIG. 3, the inner diameter of the discharge nozzle was 50 mm.; that of the suction nozzle was 50 mm.; the distance between the discharge nozzle and the suction nozzle was 25 mm. Extrudates of cobalt-molybdenum-alumina of 0.8 mm. in length and 3 mm. in diameter were introduced into a reaction tank. Then, Khafji topped crude oil having the same characteristics as that used in Example 2 was fed into the reaction tank under a temperature of 400° C. and a pressure of 200 kg./cm.$^2$ and was subject to hydrodesulfurization reaction.

When the circulating linear velocity of reaction liquid in the suction nozzle was set at approximately 1000 mm. per sec., 30 l. of catalyst particles could be withdrawn.

We claim:

1. A method of withdrawing catalyst particles comprising the steps of
   supplying a catalyst from the upper portion of a reaction tank having a material feed pipe at the lower portion thereof and a product-taking-out-pipe at the upper portion thereof,
   generating a pressure difference between a discharge nozzle to a suction nozzle by means of a pump provided outside said reaction tank, in which said discharge nozzle and said suction nozzle are provided, so that the open ends of said discharge nozzle and said suction nozzle face each othe in a catalyst region, said discharge nozzle being connected to the discharge side of said pump and said suction nozzle being connected to the suction side of said pump,
   causing by means of said pressure difference a flow of a reaction liquid accompanying said catalyst through said suction nozzle to said catalyst recovery tank provided between said suction nozzle and said pump, and
   recovering said catalyst from said reaction liquid in said catalyst recovery tank.

2. An appartus for withdrawing catalyst particles comprising
   a reaction tank having a material feed pipe at the lower portion thereof and a product-taking-out-pipe at the upper portion thereof and being charged with catalyst,
   a catalyst feed pipe connected to the upper portion of said reaction tank,
   a discharge nozzle and a suction nozzle provided at the lower portion of said reaction tank so as to face each other,
   a pump whose discharge side is connected to said discharge nozzle and whose suction side is operatively connected to said suction nozzle, and
   a catalyst recovery tank provided between said suction nozzle and said pump whereby a reaction liquid accompanying said catalyst is sucked into said suction nozzle by the pressure difference generated by said pump, so as to be directed from said discharge nozzle to said suction nozzle.

3. The apparatus, as set forth in claim 2, wherein
   the distance between said discharge nozzle and said suction nozzle is adjusted by slidably moving either of said two nozzles.

4. The apparatus, as set forth in claim 2, wherein
   said discharge nozzle and said suction nozzle are fitted to each other, and
   a plurality of slits being provided on respective fitted portions thereof, and the opening of the slits thus formed are adjusted by rotating or sliding either of said two nozzles.

References Cited

UNITED STATES PATENTS

| | | | |
|---|---|---|---|
| 3,410,791 | 11/1968 | Perry et al. | 208—157 |
| 3,523,888 | 8/1970 | Stewart et al. | 208—157 |
| 3,410,792 | 11/1968 | Van Driesen et al. | 208—157 |
| 1,304,200 | 5/1919 | Prescott | 134—24 |
| 1,796,878 | 3/1931 | Watson | 134—24 |
| 2,450,308 | 9/1948 | Smith | 134—24 |
| 3,513,025 | 5/1970 | Gutrich | 134—24 |

HERBERT LEVINE, Primary Examiner

U.S. Cl. X.R.

208—157, 216; 23—1 E, 288, 288 E; 134—22 C, 24